United States Patent
Tan

(10) Patent No.: US 9,596,074 B2
(45) Date of Patent: Mar. 14, 2017

(54) CLOCK RECOVERY FOR DATA SIGNALS

(71) Applicant: Tektronix, Inc., Beaverton, OR (US)

(72) Inventor: Kan Tan, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 15/076,173

(22) Filed: Mar. 21, 2016

(65) Prior Publication Data

US 2016/0323094 A1   Nov. 3, 2016

Related U.S. Application Data

(60) Provisional application No. 62/155,837, filed on May 1, 2015.

(51) Int. Cl.
| | |
|---|---|
| *H04L 25/00* | (2006.01) |
| *H04L 25/40* | (2006.01) |
| *H04L 7/033* | (2006.01) |
| *H04L 7/00* | (2006.01) |

(52) U.S. Cl.
CPC ............ *H04L 7/033* (2013.01); *H04L 7/0008* (2013.01); *H04L 7/0331* (2013.01)

(58) Field of Classification Search
CPC ..... H04L 7/033; H04L 7/0331; H04L 7/0008; H04L 7/027; H04L 7/0334; H04L 49/90; H04L 7/0054; H03L 7/07
USPC ............. 375/371, 373; 331/16, 23; 307/409; 327/2
See application file for complete search history.

(56) References Cited

U.S. PATENT DOCUMENTS

| | | | | |
|---|---|---|---|---|
| 4,390,801 A | * | 6/1983 | Kurata | H04L 7/033 307/409 |
| 4,435,687 A | * | 3/1984 | Nadan | H04L 7/027 331/23 |
| 5,793,212 A | | 8/1998 | Om | |
| 6,028,902 A | * | 2/2000 | Kiyanagi | H04L 7/0054 327/2 |
| 6,049,213 A | | 4/2000 | Abadeer | |

(Continued)

OTHER PUBLICATIONS

John R. Barry, Edward A. Lee, and David G. Messerschmitt, "Digital communication", Third Edition, Kluwer Academic Publishers, 2004.

(Continued)

*Primary Examiner* — Phuong Phu
(74) *Attorney, Agent, or Firm* — Michael A. Nelson; Marger Johnson

(57) ABSTRACT

Embodiments of the present invention provide improved techniques for recovering clock information from data signals. In one embodiment, a general purpose device such as a real-time oscilloscope acquires a data signal. The device takes a derivative of the data signal, then computes the square or absolute of the derivative before applying a bandpass filter. The bandpass filter is a windowing function a spectrum that is wider than the clock, and has a flat top and smooth transitions on both sides. In one embodiment, at Tukey window may be used. The device finds edge crossing times of the filtered result, and applies a phase-locked loop or lowpass filter to the edge crossing times in order to recover a stable clock signal. When the improved techniques are implemented in software, they may be used with any number of different equalizers that are required by various high-speed serial data link systems.

22 Claims, 13 Drawing Sheets

(56) References Cited

U.S. PATENT DOCUMENTS

| | | |
|---|---|---|
| 6,812,688 B2 | 11/2004 | Tan et al. |
| 8,374,231 B2 | 2/2013 | Tan |
| 8,855,186 B2 | 10/2014 | Tan |
| 2005/0058234 A1* | 3/2005 | Stojanovic ............ H04L 7/0334 375/371 |
| 2010/0102888 A1* | 4/2010 | Edwards ................... H03L 7/07 331/16 |
| 2011/0228888 A1* | 9/2011 | Gelter ..................... H04L 49/90 375/371 |

OTHER PUBLICATIONS

Adam Healey and Mark Marlett, "Introduction to DFEEYE", Sep. 27, 2007.
"Universal Serial Bus 3.1 Specification", Revision 1.0, Jul. 26, 2013.
"PCI Express Base Specification Revision 3.0", Nov. 10, 2010.
John G. Proakis and Dimitris G. Manolakis, "Digital Signal Processing: Principles, Algorithms, and Applications", Third Edition, Prentice-Hall, Inc. 1996.

\* cited by examiner

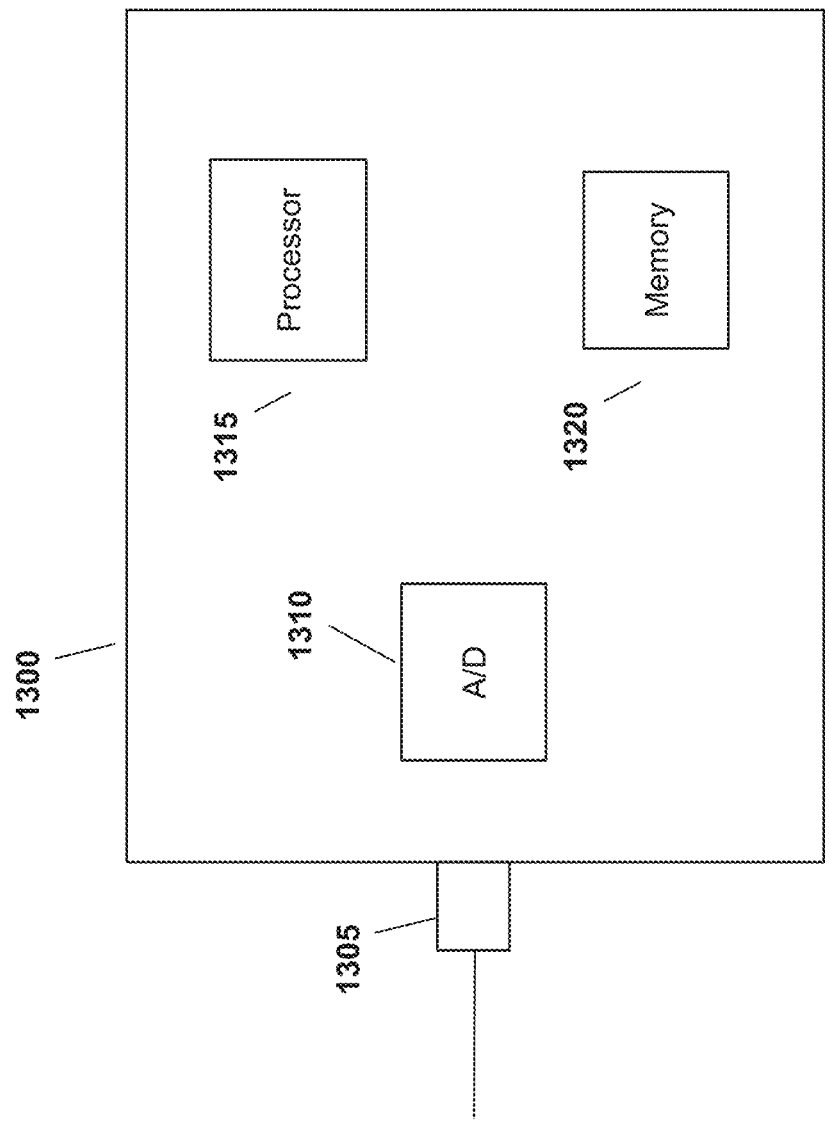

CLOCK RECOVERY FOR DATA SIGNALS

FIELD OF THE INVENTION

The present invention relates to techniques for recovering clock signals from high speed data signals. In particular, data signals that have spread-spectrum clocking and high inter-symbol interference.

BACKGROUND OF THE INVENTION

High speed serial data link systems 100 are composed of a transmitter (Tx) 105, a channel 110, and a receiver (Rx) 115, as shown in FIG. 1. Transmitter 105 sends data signals to receiver 115 over channel 110. As is known in the art, the channel 110 may comprise any physical transmission medium, including copper wire, coaxial cable, optical fiber, or (in the case of wireless transmission) the air. Channel 110 may also comprise multiple mediums.

As high speed serial standards move beyond 6 Gb/s, equalization techniques start being widely deployed, to correct for signal degradation caused by effects in the channel such as channel loss, reflection, cross talk, and noise. In particular, pre-emphasis or de-emphasis techniques may be used in the transmitter 105, while the receiver 115 may use linear equalization techniques such as Continuous Time Linear Equalizers (CTLE) and Feed Forward Equalizers (FFE). Another well-known technique for removing signal degradations, especially those caused by Inter-Symbol interference (ISI) due to channel insertion loss and reflections, or noise from crosstalk and other sources, is the non-linear, decision feedback equalizer (DFE).

Often, each serial data standard requires a specific type of equalization. The USB 3.1 Gen 2 standard, for example, specifies a compliance channel that has insertion loss of 13 dB at the fundamental frequency (5 GHz). To maintain system performance, the USB 3.1 Gen 2 standard specifies that the receiver has a CTLE and a one-tap DFE, as shown in FIG. 2. The CTLE 200 counteracts attenuation caused by the channel, while the DFE 205 attempts to further reduce inter-symbol interference (ISI) in the received data. Receivers that conform to the standard typically have hardware equalization circuits. In contrast, general-purpose measurement devices such as oscilloscopes typically perform equalization in software, since the device may need to use different equalization depending on what standard a received data signal conforms to.

In addition, the data signals sent from the transmitter often include an bedded clock signal that must be recovered by the receiver. Spread-spectrum clocking (SSC) is commonly used in high frequency signals to reduce electromagnetic emissions at the clock frequency. The frequency spectrum for a clock signal that does not have SSC will consist primarily of a single frequency. But when SSC is used, the clock's spectrum will be spread across multiple frequencies. This reduces the magnitude at each individual frequency. But, the wider spectrum of the SSC makes it more sensitive to channel loss. Channel loss typically affects frequencies at the higher end of the data signal's spectrum more than lower frequencies. This spectrum distortion may introduce ISI, making the clock signal with SSC harder to recover. Other signal integrity issues such as cross coupling and other noise, insertion loss, or reflections, may also cause issues.

In addition, SSC introduces low-frequency jitter into the clock signal, which must be removed by the clock recovery in the receiver. Some devices use dedicated clock-recovery circuitry in hardware to remove this jitter, as shown in FIG. 3. When the data signal includes clock data, the received signal 300 may be sent through a clock recovery circuit 305. In one implementation, the clock recovery circuit 305 may comprise a phase-locked loop (PLL). PLL implementations are typically required when the data signal has SSC, because the PLL is able to track out large low-frequency jitter introduced by SSC.

For example, the "Golden PLL" method uses a hardware phase locked loop (PLL) to track out low frequency jitter in the clock signal. FIG. 4 shows an ideal PLL specification. The grey line represents the PLL's ability to track jitter in the recovered clock, where a higher value represents better jitter tracking. The black line represents jitter error. As shown in FIG. 4, the Golden PLL approach will have minimal error for data signals with low-frequency jitter which is the type of jitter introduced by SSC.

In some cases, equalization techniques such as the CTLE and DFE discussed above may be used to track out ISI from data signals with SSC. Software-based clock recovery techniques are preferable for a number of reasons. First, as discussed above, general-purpose devices must often receive a umber of different data signals, each of which may require a different equalization technique. It is generally not practical to include specific clock-recovery or equalization hardware for every type of data signal that the device may receive. Thus, software-based clock recovery allows greater flexibility. Secondly, it is often less expensive to perform clock recovery in software, since it eliminates the need for expensive clock recovery circuitry. Third, software-based clock recovery techniques may perform better than hardware-based clock recovery circuits. For example, hardware clock recovery approaches are often subject to limitations such as temperature-based effects that software approaches do not have. In addition, hardware clock recovery circuits often have their own bandwidth limitations. For example, current hardware-based clock recovery circuits in real-time and sampling oscilloscopes are not capable of recovering clock data from a 60 Gb/s signal. In contrast, software-based clock recovery techniques can be used to recover clock data front these high-speed signals.

Fourth, it can be useful to perform clock recovery and equalization separately. In hardware, however, these processes are often performed by the same circuitry. Performing the clock recovery in software may provide greater flexibility, since the same clock recovery technique can be used with any number of equalization techniques. In some cases, it might also be useful to view the un-equalized clock for analysis or simulation purposes.

Unfortunately, some ex sting software clock recovery techniques may perform poorly for data signals that have high ISI, which for example, can be caused by channel loss or reflections. One software technique, based on edge crossing times, is known as the "Golden Software PLL." As described in U.S. Pat. No. 6,812,688, the Golden Software PLL approach uses edge crossing times in the data signal to recover the clock signal. This technique does not work well, however, when some of the edge crossings are missing. This may occur when there is high inter-symbol reference, one cause of which is when the data signal has been through a high-loss channel.

FIG. 5 shows an exemplary SSC implementation in which the clock rate is varied between abase unit interval 500 and a greater unit interval 505. For example, between 10 GHz and 9.95 GHz. In this example, SSC introduces roughly 30 kHz of jitter into the data signal. When the data signal has high ISI, like the signal shown in FIG. 6, some of the edge crossings will be missing in the received signal. Points 600, 605, and 610 each represent a section of the received signal that has one or more missing edge crossings. These missing edge crossings will introduce errors when the edge crossing based Golden Software PLL is used, since the approach relies on edge crossing times for clock recovery.

Another existing software-based clock recovery technique known as the spectral line approach uses the following steps to recover a clock signal: (1) acquire a data signal, (2) find its derivative, (3) compute the square or absolute value of the derivative, (4) apply a bandpass filter that is defined according to the ideal PLL specification, and (5) find the edge crossing time of the filtered result. The edge crossing times represent the recovered clock signal. The spectral line approach works well on data signals that have SSC if the data signal has low ISI, but does not work well for data signals that have SSC and high ISI. For example, FIG. 7 represents a data signals obtained after step 4 of the spectral line approach. As depicted in FIG. 7, the "Clock" spectrum 700 is not symmetric around its center frequency, due to effects such as channel loss. As is known in the art, channel loss typically affects a signal's higher frequencies more than its lower frequencies. For example, in spectrum 700, the frequencies close to 9.97 GHz are more attenuated than frequencies closer to 9.96 GHz. In comparison, the spectrum for a bandpass filter based on the ideal PLL specification is symmetric around its center frequency, as shown by spectrum 705. When the distortion of spectrum 700 is severe enough, some edge crossings may be missing during step 5 of the spectral line approach. This may introduce errors into the recovered clock.

These channel loss effects are more problematic for signals with SSC, because SSC widens the clock's spectrum. Signals that have a single clock frequency are not affected as much, because the clock's spectrum is narrow. This makes clock recovery difficult when using the spectral line approach for data signals with SSC that have signal integrity issues such as ISI, cross coupling and other noise, insertion loss, or reflections, all of which may be caused by a lossy channel and environment.

FIG. 8 represents an eye diagram and jitter plot for a clock that was recovered by the spectral line approach. In this example, the received data signal uses the SSC implementation shown in FIG. 6, and has high ISI. As shown by the jitter plot 805, the spectral line approach fails to track out the large low jitter introduced by SSC. This is also reflected by the small eye openings in the eye diagram 800. As shown in plot 805, the jitter in the recovered clock has a period of roughly 33 μs, latch is the same as the SSC period shown in FIG. 5.

Thus, there is a need for improved techniques to recover a stable clock from data signals that have SSC and signal integrity issues such as ISI, cross coupling and other noise, insertion loss, or reflections.

SUMMARY OF THE INVENTION

Embodiments of the present invention provide improved techniques for recovering a clock from data signals that have spread-spectrum clocking (SSC) and high signal integrity issues such as inter-symbol interference (ISI). Traditional techniques, such as the (edge crossing based) golden software PLL and the spectral line approach, do not work well for these data signals.

In one embodiment, a data signal is acquired. A derivative of the acquired signal is taken. Next, the square or absolute value of the derivative is taken and a bandpass filter is applied. The bandpass filter is implemented as a windowing function in frequency domain that is wider than the clock's spectrum and has smooth transitions on both sides. The bandpass filter parameters may be adjusted based on the received signal, to accommodate different data signals with varying amounts of SSC. In one embodiment, a Tukey window may be used for the bandpass filter.

Next, the edge crossing times of the filtered result are found. To recover a stable clock from the edge crossing times, a phase-locked loop (PLL) may be applied in order to recover a stable clock. For example, a software may be designed according to the ideal PLL specification. In one embodiment, for example, the "golden software PLL" method may be used. In at other embodiment, a lowpass filter may be applied to the jitter instead of a PLL, to recover a stable clock.

Optionally, one or more linear equalization techniques such as de-emphasis, pre-emphasis, CTLE, or FFE equalizers may be applied after acquiring the data signal, to partially compensate the channel loss before performing the clock recovery method described above.

The improved devices and techniques may be used to improve clock recovery on data signals with spread-spectrum clocking that are subject to signal integrity issues such as ISI, cross coupling, insertion loss, reflections, or other noise.

BRIEF DESCRIPTION OF THE DRAWINGS

FIG. 13 depicts an exemplary instrument for perforating clock recovery in accordance with the present invention.

DETAILED DESCRIPTION OF THE INVENTION

Figure 9:
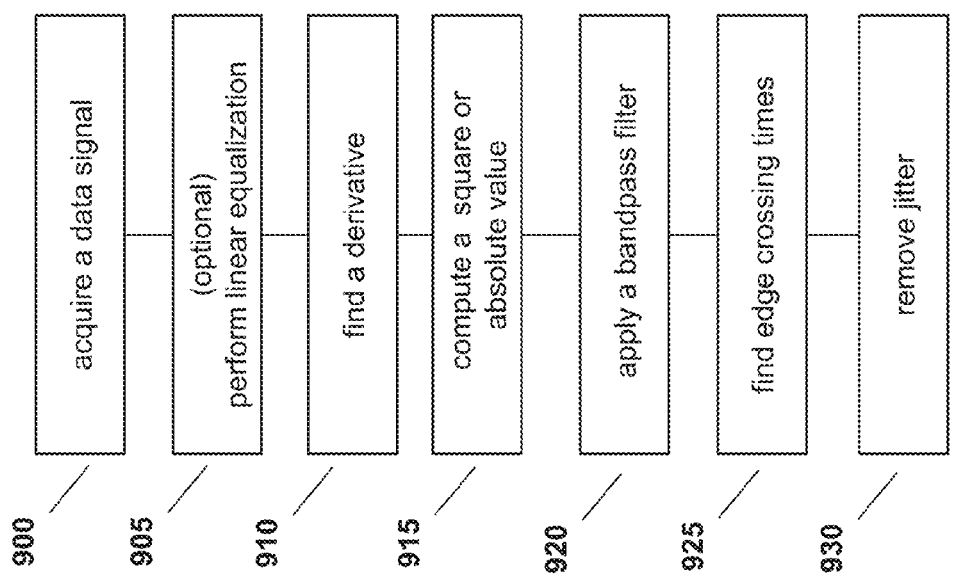
FIG. 9 depicts a method for clock recovery in accordance with one embodiment of the present invention.
Figure 10:
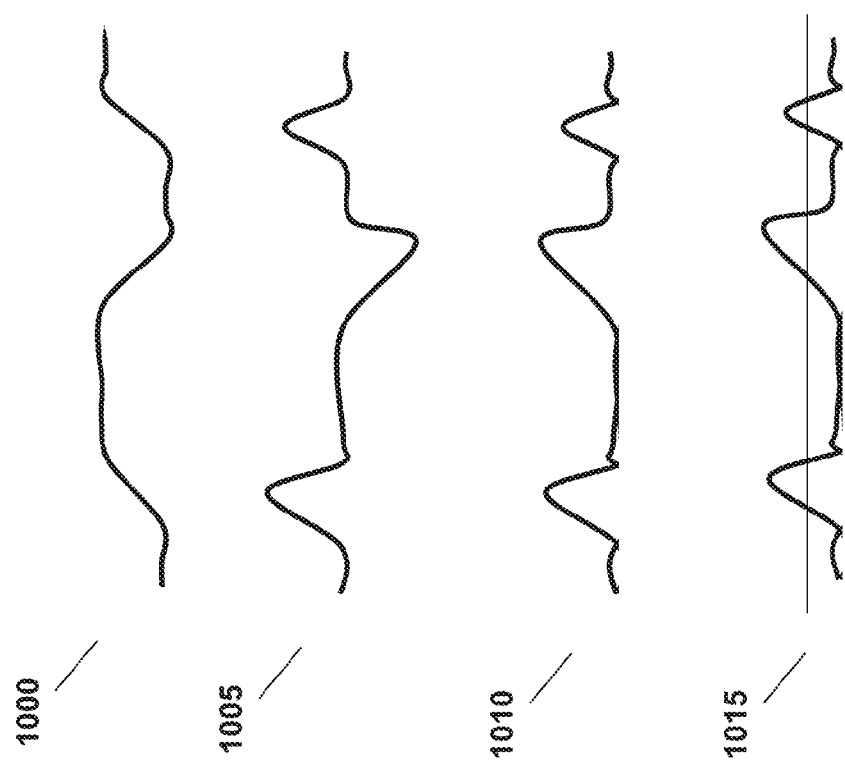
FIG. 10 depicts exemplary waveforms obtained by performing clock recovery in accordance with the present invention.

FIG. 9 depicts a flowchart for embodiments that perform the clock recovery in accordance with the present invention. In one embodiment, the operations depicted in FIG. 9 may be performed by a general-purpose instrument such as an oscilloscope. At step 900, a device performing a method in accordance with the present invention acquires a data signal. For example, waveform 1000 in FIG. 10 depicts an acquired data signal. Optionally, at step 905 one or more linear equalization techniques such as de-emphasis, pre-emphasis, CTLE, or FFE equalizers may be applied to the acquired data signal to partially compensate for the channel loss. Next, the data signal's derivative is computed at step 910, as represented by data waveform 1005 in FIG. 10. At step 915, the square or absolute value of the derivative is taken, which converts any negative pulses in the data signal into positive pulses, as depicted by waveform 1010 in FIG. 10. Both the square and absolute value operations effectively convert the negative pulses into positive pulses, so either may be used.

At step 920 in FIG. 9, a bandpass filter is applied to the result of step 915, in order to remove frequencies that are not relevant to the clock signal. Unlike the PLL-based filter used in the prior art spectral line approach, the bandpass filter applied in step 920 is a windowing function that has a flat top, a wider frequency spectrum than the clock spectrum, and has smooth transitions on both sides. In one embodiment a Tukey window may be used, however any suitable windowing function may be used for the bandpass filter. This effectively removes any spectral distortion from the filtered result.

Figure 1:
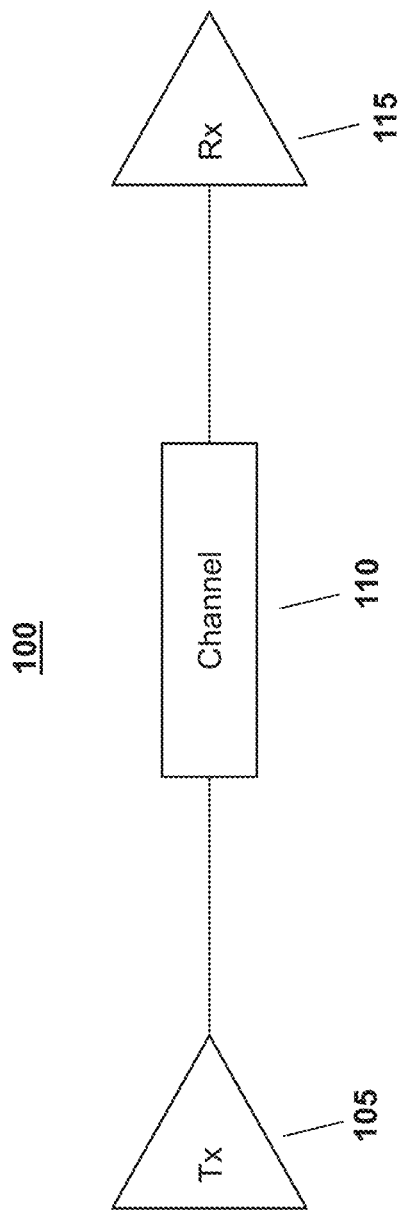
FIG. 1 depicts a prior art high speed serial data link system.
Figure 2:
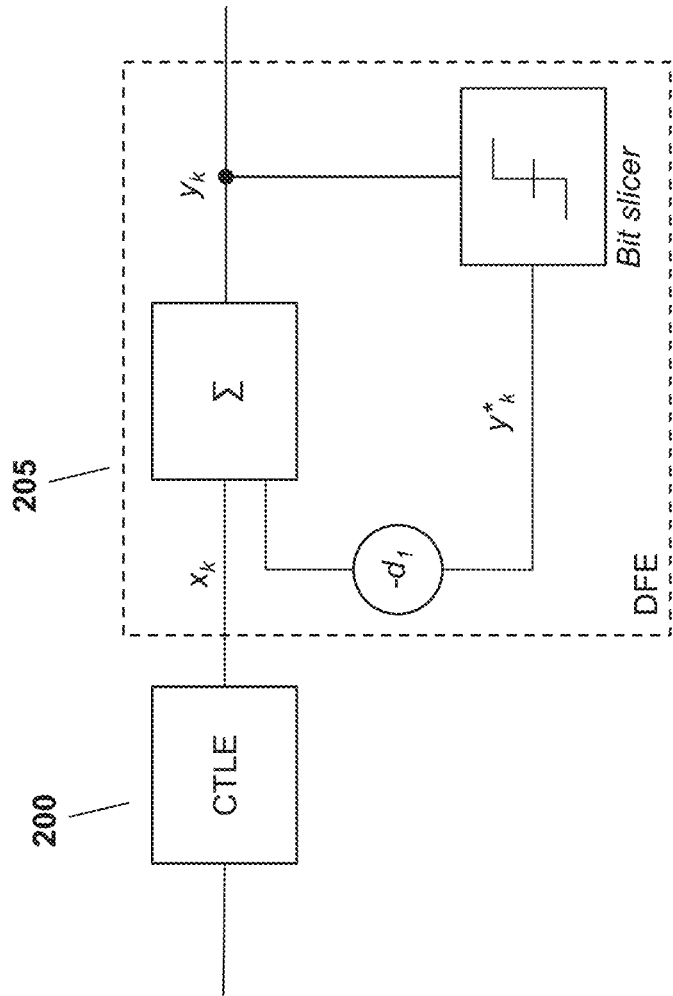
FIG. 2 depicts a prior art receiver equalizer.
Figure 3:
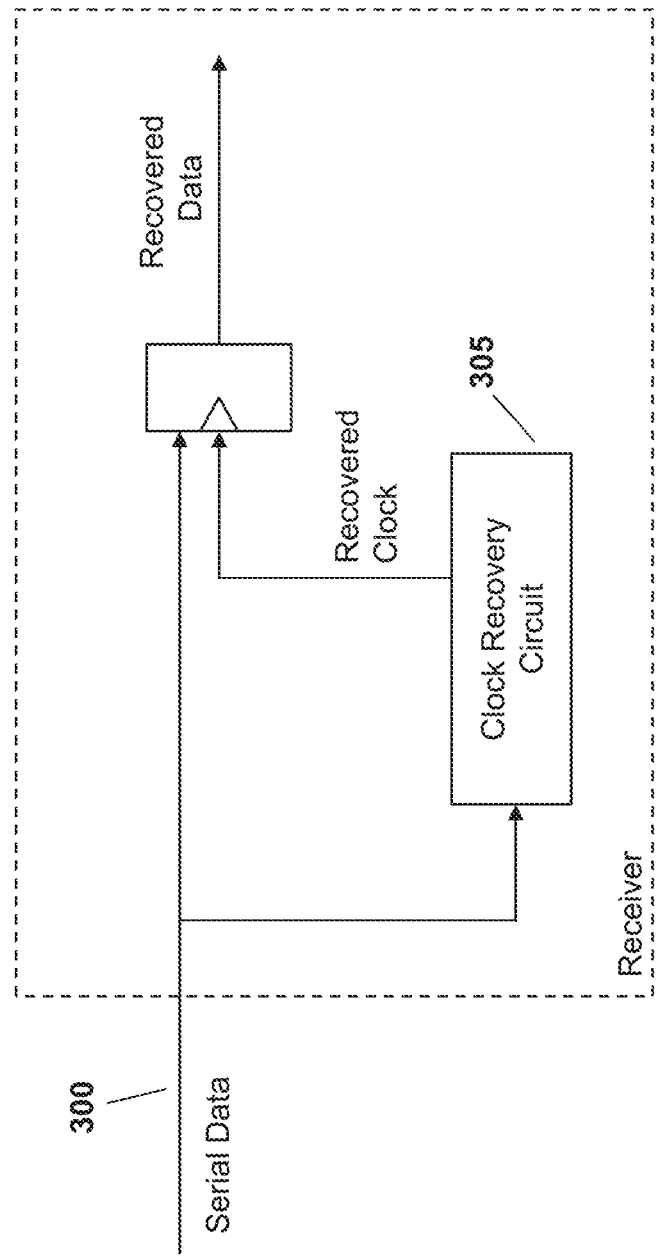
FIG. 3 depicts a prior art receiver with a clock recovery circuit.
Figure 4:
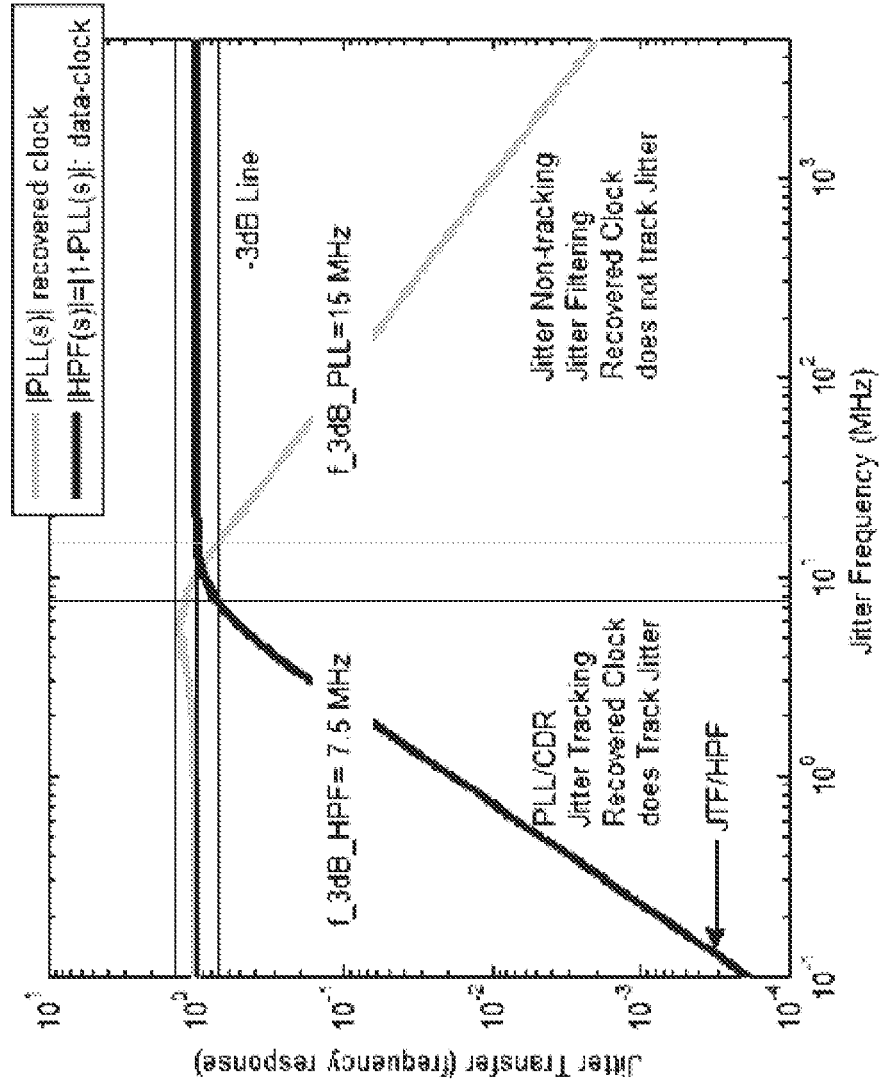
FIG. 4 depicts a prior art ideal PLL specification.
Figure 5:
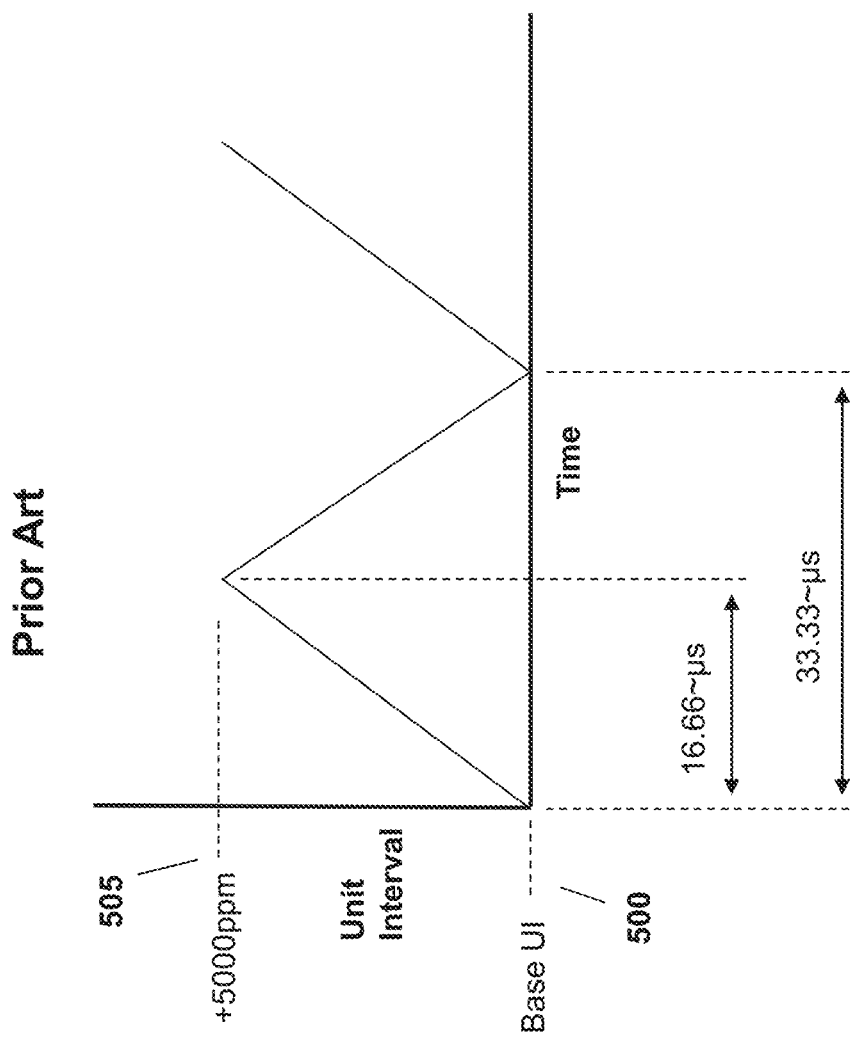
FIG. 5 depicts an exemplary prior art clock modulation for spread spectrum clocking.
Figure 6:
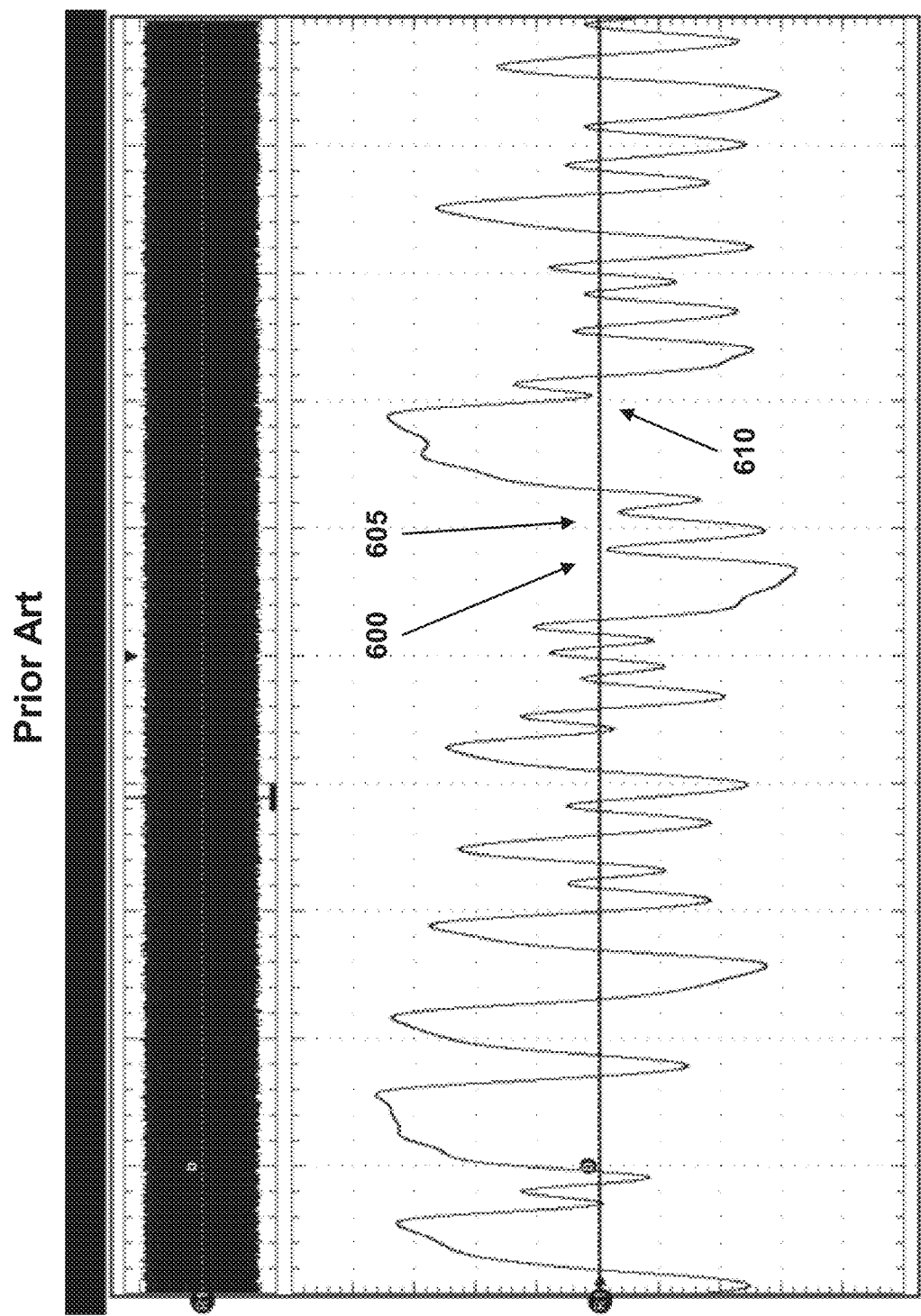
FIG. 6 depicts an exemplary prior art data signal with missing edge crossings.
Figure 7:
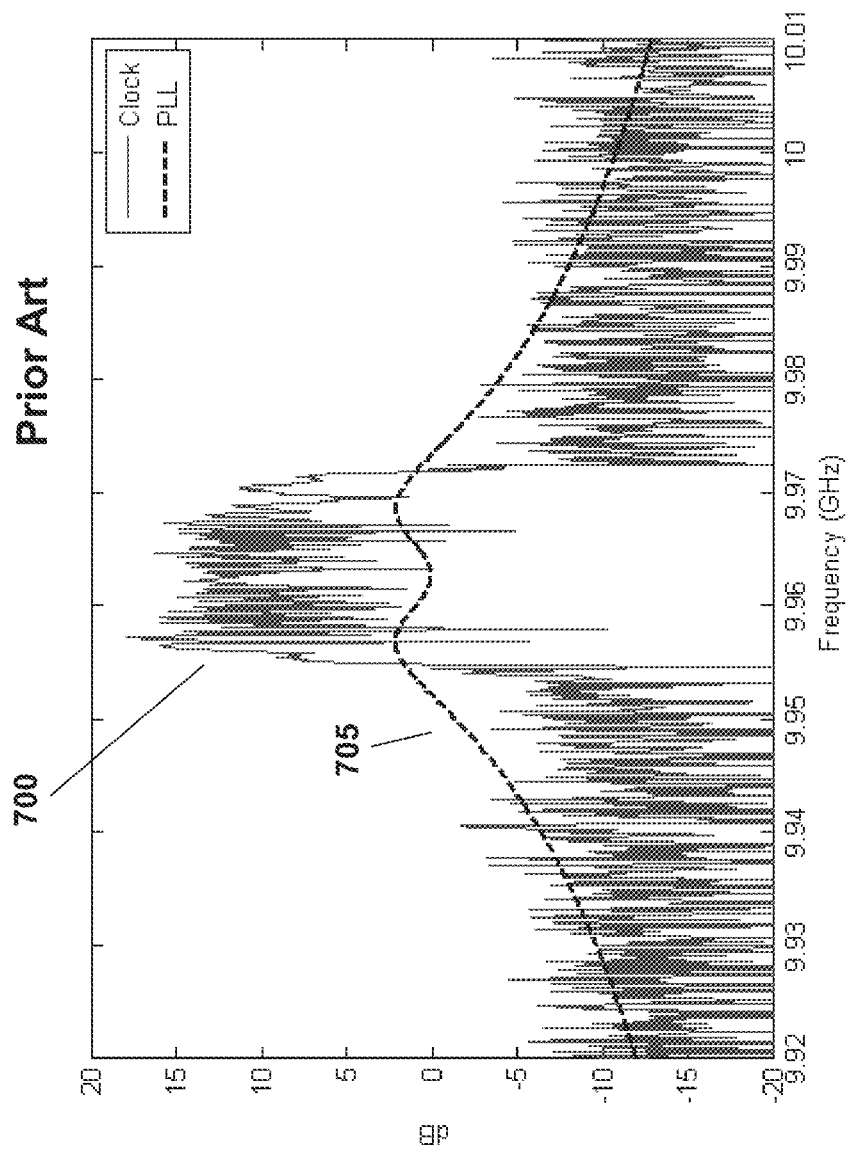
FIG. 7 depicts a frequency spectrum created by applying a prior art spectral line approach to an exemplary data signal with SSC.
Figure 11:
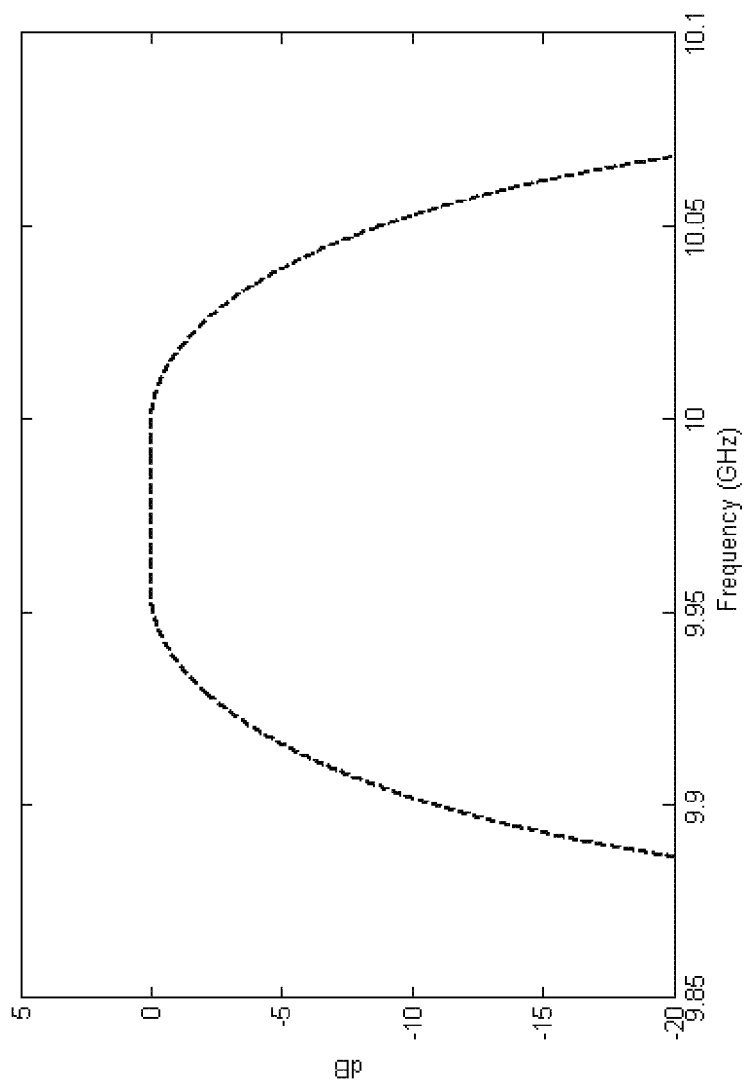
FIG. 11 depicts the frequency spectrum of an exemplary Tukey window.

In contrast, the PLL filter used in the prior art spectral line approach is not flat and attenuates some frequencies more than others. This type of filter is necessary to track the low frequency jitter caused by SSC, but may distort the clock spectrum information at the same time. For example, as shown by PLL spectrum 705 in FIG. 7, the spectral line approach will emphasize data at the center frequency of the PLL less than data at the frequencies immediately on either side of the center. In contrast, FIG. 11 depicts an exemplary Tukey window that attenuates frequencies lower than 9.95 GHz or larger than 10 GHz. Because the window function has a flat top, it will maintain all of the clock spectrum information. Even when the clock spectrum is asymmetrical (e.g., because of SSC and channel loss) all of the clock spectrum information is preserved during step 920.

At step 925, the edge crossing times of the filtered result are found, as represented by waveform 1015 in FIG. 10. Unlike the prior art spectral line approach, embodiments performing clock recovery in accordance with the present invention then track out any SSC jitter to recover a stable clock at step 930. In one embodiment, a phase-locked loop (PLL) such as the "golden software PLL" may be used. The clock PLL provides a robust way to track out the SSC jitter. Other embodiments may apply a lowpass filter to the jitter to recover the clock, instead of using a PLL.

Figure 8:
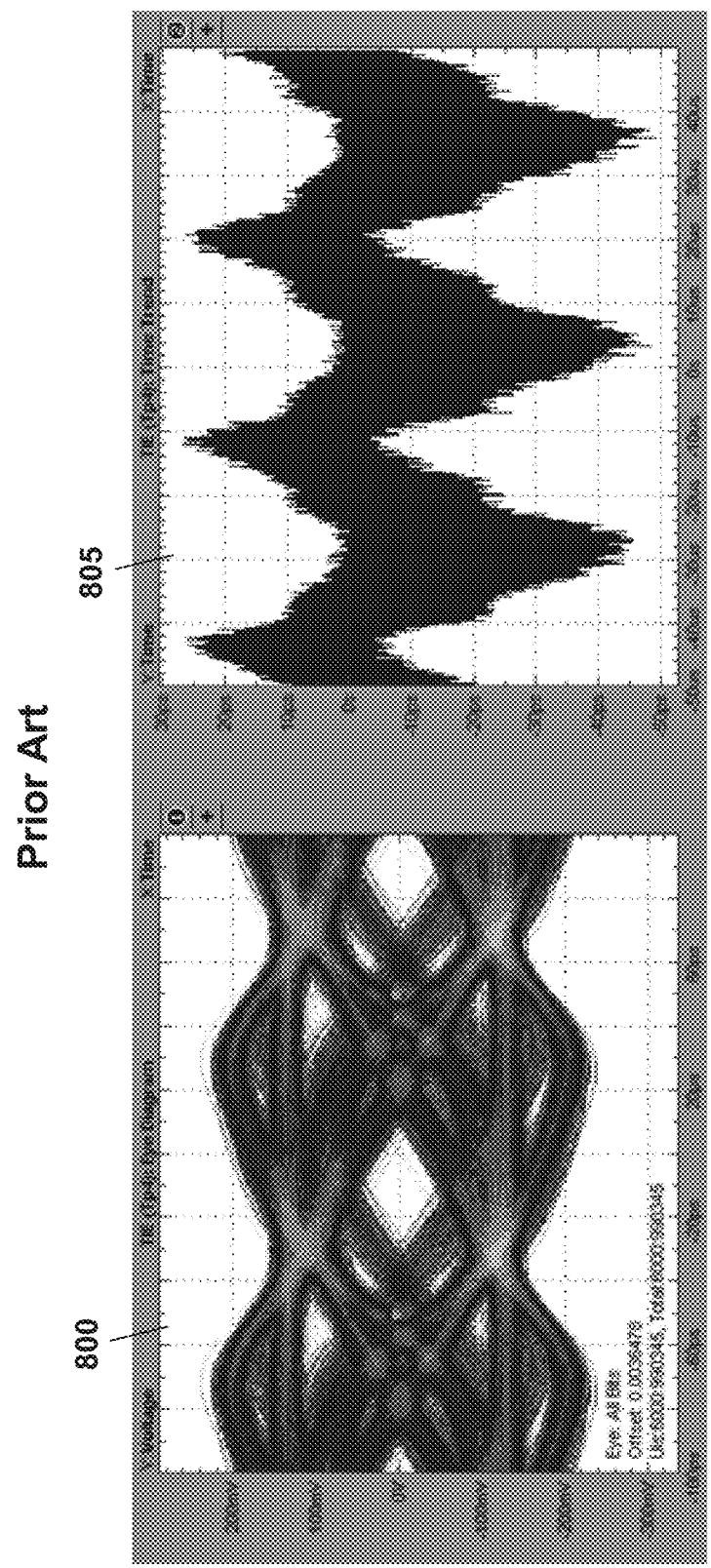
FIG. 8 depicts an exemplary eye diagram and jitter trend obtained by using a prior art spectral line clock recovery method.
Figure 12:
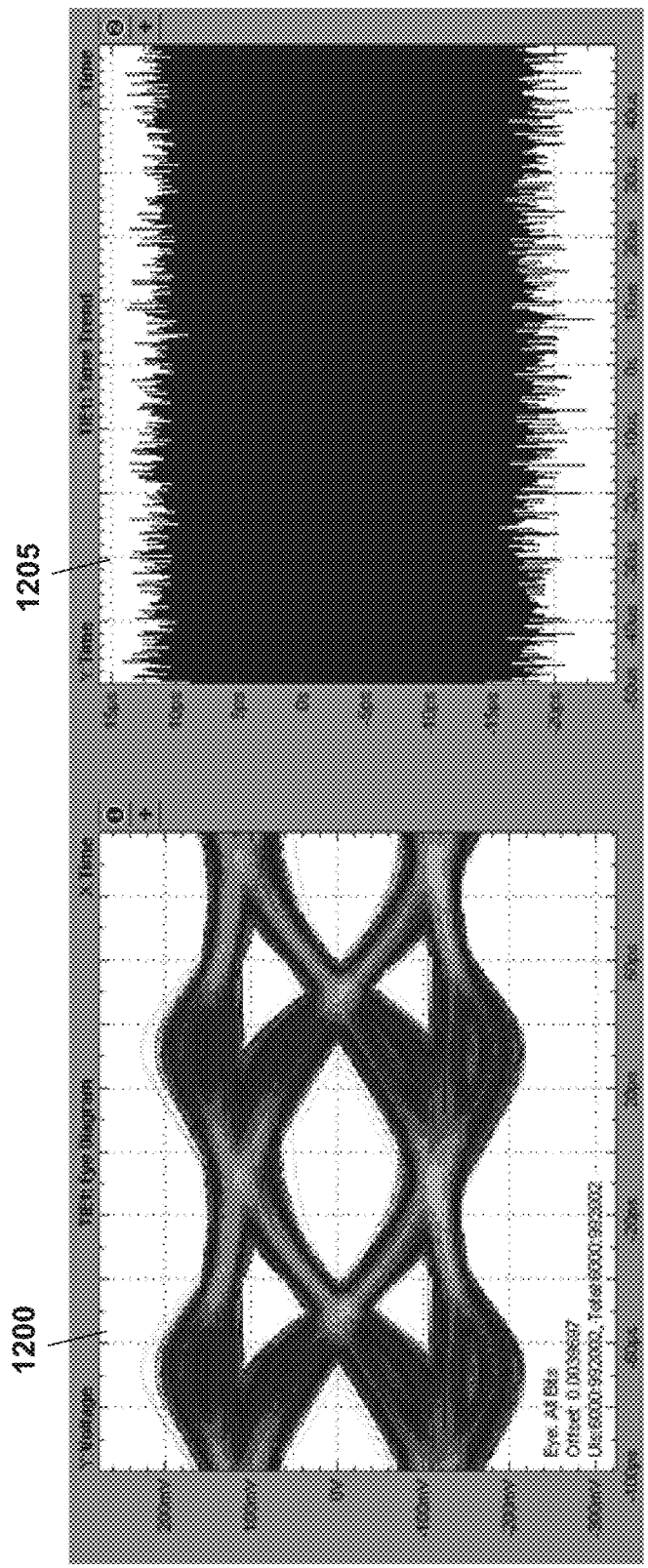
FIG. 12 depicts an exemplary eye diagram and jitter trend obtained by performing clock recovery in accordance with the present invention.

FIG. 12 depicts an eye diagram 1200 and jitter time trend plot 1205 that were obtained by performing clock recovery in accordance with the present invention using the same data signal that was used to obtain the eye diagram 800 and jitter time trend plot 805 in FIG. 8. As shown in FIG. 12, the eye diagram 1200 is wide open, and jitter time trend plot 1205 shows that SSC jitter has been removed. The peak-to-peak value of the jitter in trend plot 1205 is roughly 35 ps. This is much smaller than the roughly 70 ps of jitter shown in plot 805 for a clock that was recovered using the spectral line approach.

In one embodiment, the improved clock recovery techniques may be performed by an exemplary general-purpose device 1300 such as a real-time oscilloscope, as depicted in FIG. 13. Device 1300 may acquire data signals through a physical interface 1305 such as a digital or analog input, or interface such as a network, memory, or device interface. In embodiments where interface 1305 receives analog signals, analog-to-digital (A/D) converter 1310 may be used to convert the analog signal into a digital signal. In another embodiment, the data signal may be acquired from memory (for example, memory 1320), or from another device. Memory 1320 may store instructions that cause processor 1315 to perform the improved clock recovery techniques when executed. Memory 1320 may also store data acquired from physical interface 1305. The recovered clock may be stored in memory 1320, output to a different device, or used for further operations by processor 1315. Memory 1320 may comprise one or more separate memories, including memory located in one or more other devices.

Although specific embodiments of the invention have been described for purposes of illustration, it will be apparent to those skilled in the art that various modifications may be made without departing from the spirit and scope of the invention. For example, while the disclosed techniques are useful for recovering clock data from data signals that have SSC and high ISI, the techniques may also be used to recover clock data from signals that do not have high ISI. Accordingly, the invention should not be limited except as by the appended claims.

What is claimed is:

1. A test instrument configured to recover a clock signal from a data signal, the instrument comprising:
   a physical interface for acquiring data signal information from the data signal;
   memory configured to store:
      the data signal information;
      a recovered clock signal; and
      software instructions for performing a clock recovery method, the method comprising:
         computing a derivative of the data signal information;
         computing a square or absolute of the derivative;
         obtaining a filtered result by applying a bandpass filter to the square or absolute;
         finding one or more edge crossing trifles of the filtered result;
         filtering the one or more edge crossing times to obtain a recovered clock signal; and
         storing the recovered clock signal in the memory; and
   a processor configured to execute the software instructions.

2. The test instrument of claim 1, wherein filtering the one or more edge crossing times to obtain a recovered clock signal comprises applying a phase-locked loop.

3. The test instrument of claim 1, wherein filtering the one or more edge crossing times to obtain a recovered clock signal comprises applying a lowpass filter.

4. The test instrument of claim 1, further comprising a display configured to display the recovered clock signal.

5. The test instrument of claim 1, wherein the bandpass filter comprises a windowing function.

6. The test instrument of claim 5, wherein the windowing function is a Tukey window.

7. The test instrument of claim 1, wherein the memory is further configured to store software instructions for applying a linear equalizer to the data signal information.

8. The test instrument of claim 7, wherein the linear equalizer is selected from the group consisting of de-emphasis, pre-emphasis, CTLE, and FFE equalizers.

9. A method for recovering a clock signal from a data signal, the method comprising:
   acquiring a data signal at a device, using a physical interface on the device;
   extracting data signal information from the data signal;
   computing a derivative of the data signal information;

computing a square or absolute of the derivative;

applying a bandpass filter to the square or absolute, to obtain a filtered result;

finding one or more edge crossing times of the filtered result;

filtering the one or more edge crossing times, to obtain a recovered clock signal; and storing the recovered clock signal in memory.

10. The method of claim 9, wherein the step of filtering the edge crossing times comprises applying a phase-locked loop.

11. The method of claim 9, wherein the step of filtering the edge crossing times comprises applying a lowpass filter.

12. The of claim 9, wherein the bandpass filter comprises a windowing function.

13. The method of claim 12, wherein the windowing function is a Tukey window.

14. The method of claim 9, wherein the step of acquiring a data signal further comprises applying a linear equalizer to the acquired data signal to partially compensate the channel loss.

15. The method of claim 14, wherein the linear equalizer is selected from the group consisting of de-emphasis, pre-emphasis, CTLE, and FFE equalizers.

16. A non-transitory computer readable medium containing computer executable instructions which, when executed by a processor, perform a method for recovering a clock signal from a data signal, the method comprising:

acquiring the data signal from a physical interface;

extracting data signal information from the data signal;

computing a derivative of the data signal information;

computing a square or absolute of the derivative;

applying a bandpass filter to square or absolute, to obtain a filtered result;

finding one or more edge crossing times of the filtered result;

filtering the one or more edge crossing times to obtain a recovered clock signal; and storing the recovered clock signal in memory.

17. The non-transitory computer readable medium of claim 16, wherein the step of filtering the edge crossing times to obtain a clock signal comprises applying a phase-locked loop.

18. The non-transitory computer readable medium of claim 16, wherein the step of filtering the edge crossing times to obtain a clock signal comprises applying a lowpass filter.

19. The non-transitory computer readable medium of claim 16, wherein the step of applying a bandpass filter to the square or absolute, to obtain a filtered result comprises applying a windowing function.

20. The non-transitory computer readable medium of claim 19, wherein the windowing function is a Tukey window.

21. The non-transitory computer readable medium of claim 16, wherein the step of acquiring a data signal through a physical interface further comprises applying a linear equalizer to the acquired data signal to partially compensate the channel loss.

22. The non-transitory computer readable medium of claim 21, wherein the linear equalizer is selected from the group consisting of de-emphasis, pre-emphasis, CTLE, and FFE equalizers.

* * * * *

UNITED STATES PATENT AND TRADEMARK OFFICE
CERTIFICATE OF CORRECTION

PATENT NO. : 9,596,074 B2  
APPLICATION NO. : 15/076173  
DATED : March 14, 2017  
INVENTOR(S) : Kan Tan Page 1 of 1

It is certified that error appears in the above-identified patent and that said Letters Patent is hereby corrected as shown below:

In the Claims

Column 6, Line 36, Claim 1, Line 15, "trifles" should read --times--.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*